Nov. 26, 1940.   W. B. PLUMMER   2,223,268
CATALYST CHAMBER AND CATALYST REGENERATION SYSTEM
Filed Dec. 20, 1938   2 Sheets-Sheet 2
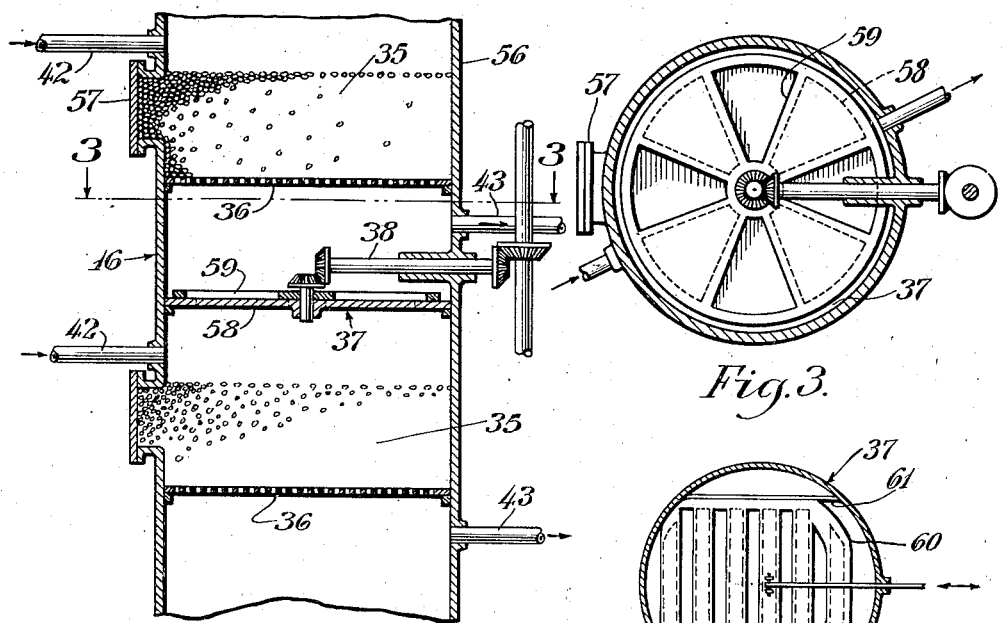
Fig. 2.
Fig. 3.
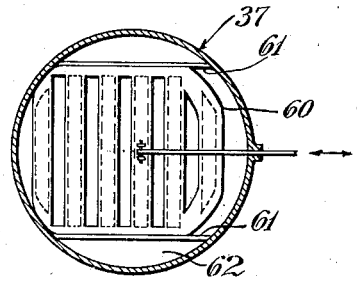
Fig. 4.
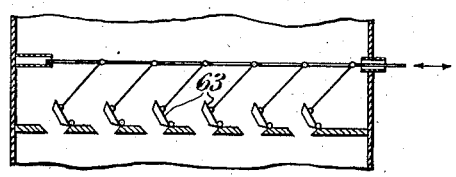
Fig. 5.
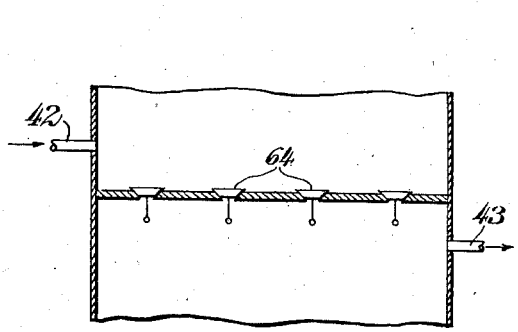
Fig. 6.
INVENTOR
William B. Plummer
BY Donald E. Payne
ATTORNEY Patented Nov. 26, 1940

2,223,268

UNITED STATES PATENT OFFICE 2,223,268

CATALYST CHAMBER AND CATALYST REGENERATION SYSTEM

William B. Plummer, Chicago, Ill., assignor to Standard Oil Company, Chicago, Ill., a corporation of Indiana Application December 20, 1938, Serial No. 246,857

6 Claims. (Cl. 23—288)

This invention relates to catalyst chambers and catalyst regeneration systems and it pertains more particularly to catalyst regeneration by oxidation in systems where temperature control during this step is important.

In the use of solid catalysts for various gaseous reactions as exemplified by the polymerization of olefinic hydrocarbons over a catalyst comprising kieselguhr impregnated with phosphoric acid, carbonaceous and tarry matter is deposited on the catalyst, making it necessary in time to regenerate the same. This is usually accomplished by combustion, and ordinarily it is necessary to use a regenerating gas containing a controlled low oxygen content in order to prevent intense local combustion and overheating of the catalyst. In systems comprising a relatively tall vertical tower completely filled with catalyst or containing relatively deep catalyst beds, the regeneration operation is difficult and time-consuming,—in commercial installations it requires many days or even weeks to effect such regeneration, without exceeding the maximum permissible temperature. An object of my invention is to provide a method and means for regenerating such catalysts which will avoid the difficulties heretofore encountered and which will make possible the rapid regeneration without overheating.

In practicing my invention I mount the catalyst on a plurality of trays in a catalyst chamber and I provide closable partitions or valves between the adjacent catalyst layers. While the catalyst chamber is on stream these partitions or valves are open so that the gases undergoing reaction may pass through the catalyst beds in series. When the catalyst becomes spent these partitions or valves are closed and the regenerating gas with its controlled low oxygen content is passed through the catalyst beds while they are effectively connected in parallel. Thus, instead of requiring days or weeks for the hot spot to move from one end of the catalyst chamber to the other, I effect catalyst regeneration in a few hours without overheating. The invention will be more clearly understood from the following detailed description and from the accompanying drawings which form a part of this disclosure, and in which:

Fig. 2 is a vertical section through a portion of a catalyst chamber showing the relation of closable partitions to the adjacent catalyst beds;

Fig. 3 illustrates an example of my closable partition;

Fig. 4 illustrates a modified closable partition;

Fig. 5 illustrates a mechanically controlled valve system in my closable partition; and Fig. 6 illustrates an automatic valve closure for the closable partition.

Figure 1:
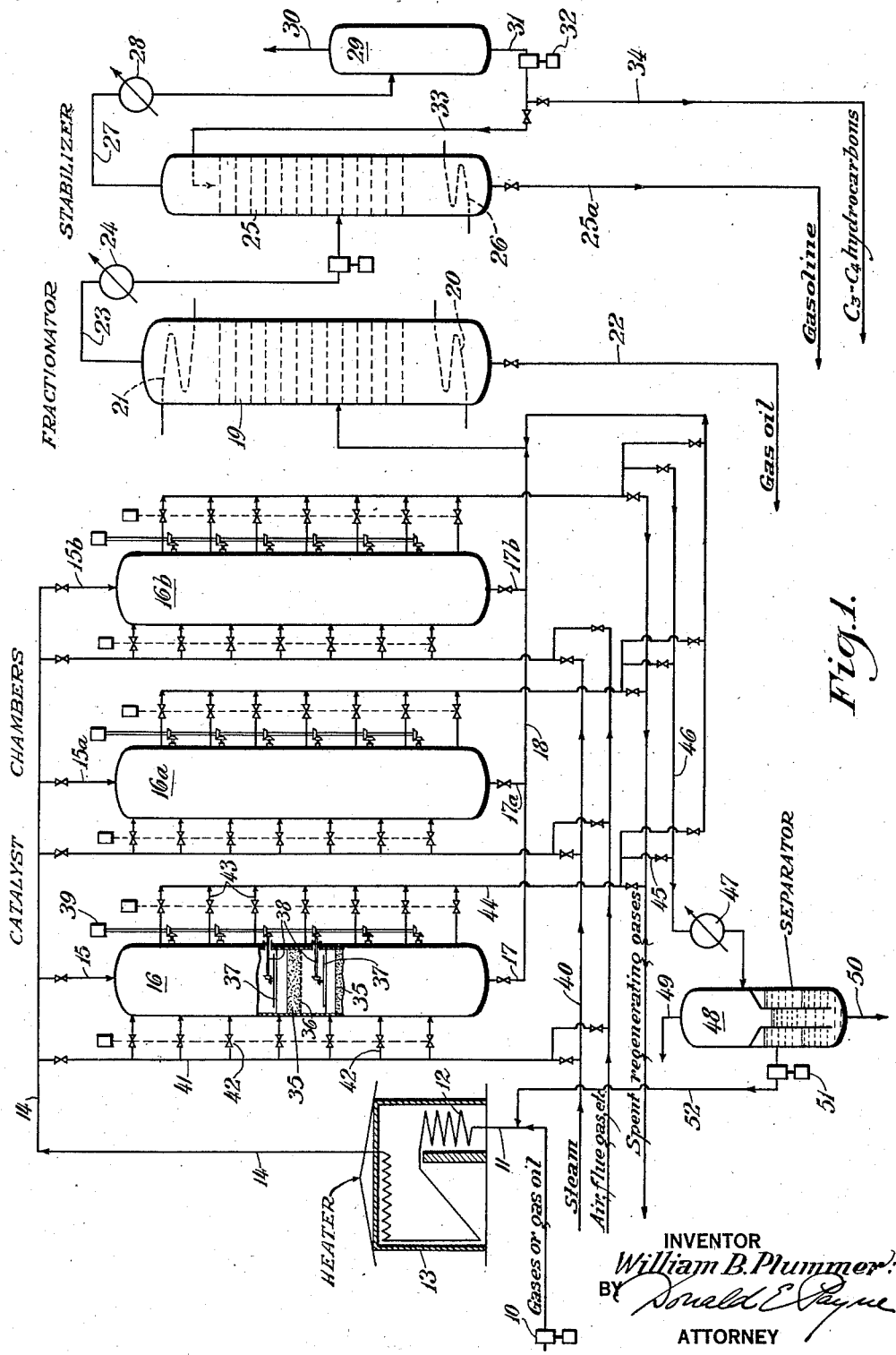
Fig. 1 is a flow diagram of my improved catalytic conversion and catalyst regeneration system.

The invention is applicable to any catalytic conversion system wherein it is necessary to regenerate the catalyst at intervals by oxidation or by any other controlled progressive treatment. Examples of such systems in the petroleum industry include catalytic polymerization systems wherein the catalyst is phosphoric acid on kieselguhr, catalytic cracking systems wherein the catalyst is an acid treated clay or silica gel impregnated with oxides of metals such as aluminum, copper, nickel, cadmium, manganese, etc. or mixtures thereof, dehydrogenation systems employing catalysts such as magnesium chromite or chromic oxides, etc. The invention will be described as applied to a catalytic cracking system employing a catalyst consisting of pelleted acid treated clay and employing Mid-Continent gas oil as a charging stock.

The gas oil is introduced by pump 10 through line 11 to coils 12 in pipe still 13 wherein it is vaporized and heated to a temperature of about 850° to 1000° F. at about atmospheric to 50 pounds pressure per square inch. The hot vapors are then passed through manifold 14 and one of the lines 15, 15a or 15b to catalyst chamber 16, 16a or 16b.

The reaction products are withdrawn from the base of this catalyst chamber through corresponding line 17, 17a or 17b to line 18 and thence conducted to fractionator 19 for the removal of high-boiling liquids heavier than gasoline. The fractionator may be provided with suitable reboiling means 20 and refluxing means 21. Products heavier than gasoline are withdrawn through line 22 and the gasoline and gases are taken overhead through line 23, cooler 24 to stabilizer 25, which is provided with a suitable reboiler 26. Gasoline is removed from the base of the stabilizer through line 27 and the $C_1$ to $C_4$ hydrocarbons and hydrogen are taken overhead through line 27 through cooler 28 to receiver 29 from which hydrogen, methane and perhaps $C_2$ hydrocarbons are vented through line 30. The $C_3$ and $C_4$ hydrocarbons are withdrawn as a liquid through line 31, part of them being forced by pump 32 through line 33 to the top of the stabilizer tower to serve as reflux, and the remainder of the $C_3$ and $C_4$ hydrocarbons being withdrawn through line 34 to storage or for use in further conversion processes.

After catalyst chamber 16 has been on stream for a period which may range from 15 minutes to 8 or 10 hours, the effectiveness of the catalyst becomes impaired because of the deposition of carbon thereon, and it is therefore necessary to close the valves in lines 15 and 17 and open the valves in lines 15a and 17a. Similarly, when it is necesary to regenerate the catalyst in chamber 16a the heated gas oil vapors are passed through catalyst chamber 16b.

In each of the catalyst chambers the catalyst is supported in separate beds 35 mounted on screens or foraminous supports 36. Between adjacent catalyst beds I provide a closable partition 37 which will be hereinafter described in more detail. These closable partitions are operated by shafts 38 extending through the chamber wall or other suitable means, which shafts may be rotated or reciprocated in unison by any conventional means from a common source 39. During the on stream operation the partitions are open so that gas may flow from the top to the bottom of the chamber. For regeneration each of these partitions is closed.

The partitions 37 being closed, steam is introduced through line 40, manifold 41 and valved lines 42 for purging the system of gas oil and other vaporizable hydrocarbons. The steam-hydrocarbon mixture is withdrawn through valved lines 43, the manifold 44, line 45 and line 46 to cooler 47 and liquid separator 48, from which gases may be vented through line 49 and water discharged to the sewer through line 50. Recovered hydrocarbons which separate out as a liquid may be returned by pump 51 and line 52 to line 11 for further conversion.

After a short period of purging the steam and purge lines are closed and regenerating gases which may preferably consist of flue gases containing a controlled small amount of oxygen are introduced through line 53, line 54, manifold 41 and lines 42 into what are in effect separate small catalyst chambers which are separated from each other by closed partitions 37. Equal distribution of the regenerating gas through the shallow catalyst bed effects uniform combustion of the carbonaceous materials. Even if there is a combustion zone or hot spot which gradually moves from the top of the catalyst bed to the bottom thereof, this "hot spot" can be advanced very slowly for avoiding overheating without unduly prolonging the regeneration time, because the catalyst layer is only a few inches thick as distinguished from prior catalyst beds which ranged in thickness from several feet to the entire length of the catalyst chamber.

Another important aspect of the invention is the lower pressure which is required for purging and for forcing the regenerating gases through the catalyst. To force a flue gas-air mixture through a deep catalyst bed requires the use of excessively high pressures, and this aggravates the tendency for the hot spots to develop excessively high temperatures. With the relatively low pressures which are required for the thin catalyst beds, any hot spots which develop do not exceed the maximum desired temperature, partly because of the low pressures and uniform distribution of the regenerating gas and partly because the heat generated can be more readily dissipated from the thin catalyst layers.

The spent regenerating gases are withdrawn through lines 43 and manifold 44 to line 55. Prior to going on stream it is desirable to purge the system of oxygen containing gases, which is readily accomplished by closing the valve in line 54 and reintroducing steam from line 40, the steam and residual regenerating gases being withdrawn through manifold 44 and line 55. This catalyst chamber is now ready to go on stream once more so that the valves in lines 42 and 43 are all closed, the partition closure means 37 are all opened, and the valves in lines 15 and 17 are opened.

All of the valves in this system may be operated by electrical, hydraulic or pneumatic means from a central control room. The particular types of valves and valve closing means form no part of the present invention and they will not be described in further detail.

It will be noted that the catalyst chamber is operated with the beds connected in series while the chamber is on stream, and operated with the beds connected in parallel during the purging and regeneration steps. Since all of these steps are at relatively low pressures, it is not necessary that the closable partitions be close fitting or wholly gas-tight, since a little leakage of regenerating gas from one chamber to another is of no particular consequence in the regeneration step. The closable partitions do serve the important and useful function of positively insuring the contact of each bed of catalyst with regenerating gases. In the absence of such partitions the regenerating gases would follow the course of least resistance and certain of the catalyst beds might be overheated while other of the catalyst beds were substantially unaffected. The closable partitions provide positive means for insuring complete purging and regeneration without exceeding the permissible regenerating temperature (which in the case of acid treated clay may be about 1050°), and they also make possible the regeneration of the catalyst in a very short time, thus materially saving on the number of catalyst chambers which are necessary for any particular system.

If the invention is applied to a catalytic polymerization process for the regeneration of the socalled phosphoric acid catalyst (phosphoric acid adsorbed on kieselguhr), it is necessary that the regeneration temperature be held below 950° F., and it is preferred that regeneration be effected at about 830° to 900° F. A chamber about 32 feet high and 8 feet in diameter and filled with spent catalyst requires four or five days for regeneration, with flue gas circulated at the rate of about 150,000 cubic feet per hour. By effecting the regeneration in parallel beds as hereinabove described, this regeneration may be effected in 3 or 4 hours without danger of overheating.

The arrangement of the catalyst beds and closable partitions is shown in further detail in Fig. 2. The tubular chamber walls 56 are provided with manheads 57 for the introduction or removal of catalyst. The closable partition 37 is mounted above gas inlets 42 and below gas outlets 43 in each space. The closable partitions may be in the form of circular dampers, one of these dampers 58 being fixed and the other, 59, being rotatable by a linkage connection with a reciprocating shaft 38, by a gear driven connection with a rotating shaft or by any other conventional means. Instead of a rotatable closure I may employ a slidable closure 60 positioned by guides 61 over fixed plate 62.

Instead of the damper arrangements shown in Figs. 3 and 4 I may employ mechanically operated flap valves 63 as shown in Fig. 5, or automatically opened check valves 64 as shown in Fig. 6. When these check valves are operated by gravity, line 15 should be connected to the bottom of the reaction vessel and line 17 to the top thereof so that the on stream flow will be upwards rather than downwards. It should be understood, however, that normally closed counterweighted or spring actuated check valves may be mounted underneath the closable partitions instead of above them, in which case the pressure of the on stream gases will cause the valves to open during the conversion step and a substantially equal pressure on both sides of the valves during regeneration will effectively isolate each catalyst bed.

While I have described my invention in detail and have illustrated various partition closing means, it should be understood that I do not limit myself to any of the details hereinabove set forth except as defined by the following claims.

I claim:

1. In combination, a catalyst chamber, fluid connections at the top and bottom of said chamber, a plurality of vertically spaced catalyst beds mounted in said chamber, a closable partition between contiguous catalyst beds, fluid connections to said chamber above and below said closable partition, and means for opening and closing said closable partition.

2. The apparatus of claim 1 wherein the closable partition consists of a slidable damper.

3. The apparatus of claim 1 wherein the closable partition is provided with a pivoted valve.

4. The apparatus of claim 1 wherein the closable partition is provided with a valve mounted to move toward and away from the plane of said partition.

5. In combination, a catalyst chamber, a plurality of contiguous catalyst beds disposed in said chamber, closable fluid connections at the opposite ends of said chamber closable partitions between contiguous catalyst beds, a closable conduit communicating with said chamber adjacent and on each side of each closable partition normally closed valves in said partitions, means for mounting said valves whereby they are automatically opened by the pressure of reaction gases, and means for holding said valves in closed position when the flow of reaction gases is stopped.

6. In catalytic conversion apparatus a catalyst chamber, closable fluid connections at each end of said chamber, a plurality of spaced catalyst beds so mounted in said catalyst chamber that fluids introduced at one end and removed from the other end of said chamber will necessarily pass through each of said beds, a closable partition mounted in said catalyst chamber in the space between contiguous catalyst beds, closable fluid connections to said chamber on each side of said closable partition and means for opening and closing said closable partition.

WILLIAM B. PLUMMER.